US008558426B2

(12) United States Patent
Stiesdal

(10) Patent No.: US 8,558,426 B2
(45) Date of Patent: Oct. 15, 2013

(54) ARRANGEMENT TO COMPENSATE A NON-UNIFORM AIR GAP OF AN ELECTRIC MACHINE

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 372 days.

(21) Appl. No.: 12/961,623

(22) Filed: Dec. 7, 2010

(65) Prior Publication Data
US 2011/0133586 A1 Jun. 9, 2011

(30) Foreign Application Priority Data
Dec. 8, 2009 (EP) .................................... 09015204

(51) Int. Cl.
*H02K 21/12* (2006.01)
*H02K 5/16* (2006.01)

(52) U.S. Cl.
USPC ............ 310/156.38; 310/156.45; 310/156.26; 310/90

(58) Field of Classification Search
USPC ...................... 310/90, 156.26, 156.38, 156.45
See application file for complete search history.

(56) References Cited

U.S. PATENT DOCUMENTS

| | | | |
|---|---|---|---|
| 2,575,153 A * | 11/1951 | Wightman | 310/40 R |
| 6,483,199 B2 | 11/2002 | Umemoto et al. | |
| 6,680,549 B2 | 1/2004 | Boardman et al. | |
| 6,700,280 B1 * | 3/2004 | Geiger et al. | 310/193 |
| 6,817,507 B2 * | 11/2004 | Yeon | 226/188 |
| 6,891,306 B1 * | 5/2005 | Soghomonian et al. | 310/216.092 |
| 7,109,623 B2 * | 9/2006 | Wada et al. | 310/156.45 |
| 7,242,121 B2 * | 7/2007 | Kadowaki | 318/400.04 |
| 2003/0080636 A1 | 5/2003 | Boardman et al. | |
| 2006/0055266 A1 * | 3/2006 | Iwami et al. | 310/156.47 |
| 2006/0152014 A1 * | 7/2006 | Grant et al. | 290/55 |
| 2008/0142284 A1 * | 6/2008 | Qu et al. | 180/65.6 |
| 2009/0134627 A1 * | 5/2009 | Stiesdal | 290/55 |
| 2010/0033050 A1 * | 2/2010 | Kobayashi et al. | 310/156.12 |

FOREIGN PATENT DOCUMENTS

| | | |
|---|---|---|
| DE | 1613289 A1 | 1/1971 |
| DE | 201 16 649 U1 | 1/2002 |
| DE | 20110520 U1 | 4/2002 |
| DE | 102004028746 A1 | 12/2005 |
| DE | 102004033257 A1 | 1/2006 |
| EP | 1586769 A2 | 10/2005 |

(Continued)

OTHER PUBLICATIONS

Translation of foreign document DE 102004028746.*

*Primary Examiner* — Tran Nguyen
*Assistant Examiner* — Alex W Mok

(57) ABSTRACT

An arrangement to compensate a non-uniform air gap, which is located in an electric machine is provided. The electrical machine includes a stator arrangement and a rotor arrangement. The rotor arrangement rotates around a longitudinal axis. At least parts of the rotor arrangement interact with parts of the stator arrangement to generate electrical power. The air gap is defined by the distance between the parts of the rotor arrangement and the parts of the stator arrangement. The parts of the stator arrangement are opposite to the parts of the rotor arrangement along a certain length. The cross section of the air gap changes along this length thus the air gap is not uniform in view to the referred certain length. The flux density of magnets, which are part of the rotor arrangement, is changed in dependency to the cross section of the air-gap.

16 Claims, 3 Drawing Sheets

(56) References Cited

FOREIGN PATENT DOCUMENTS

| EP | 1 641 102 A1 | 3/2006 |
| EP | 1710432 A1 | 9/2006 |
| EP | 1925820 A1 | 5/2008 |
| GB | 1201637 A | 8/1970 |
| GB | 1263707 A | 2/1972 |
| WO | WO 02/057624 A1 | 7/2002 |
| WO | 2005075822 A1 | 8/2005 |
| WO | 2009091248 A2 | 7/2009 |

* cited by examiner

ARRANGEMENT TO COMPENSATE A NON-UNIFORM AIR GAP OF AN ELECTRIC MACHINE

CROSS REFERENCE TO RELATED APPLICATIONS

This application claims priority of European Patent Office application No. 09015204.2 EP filed Dec. 8, 2009, which is incorporated by reference herein in its entirety.

FIELD OF INVENTION

The invention relates to an arrangement to compensate a non-uniform air gap, which is located in an electric machine. The invention especially relates to a compensation of an air-gap, which is between a rotor and a stator of a generator.

BACKGROUND OF INVENTION

Preferably the electrical machine is a generator like a "direct drive" generator used in a wind turbine.

Each generator shows an air gap, which is located between stator elements and rotor elements of the generator.

The rotor elements contain permanent magnets for example, while the stator elements contain stacked laminate plates, which support at least one winding of the stator coil.

The air gap should be relatively small to ensure a high efficiency of the generator. Thus the air gap should stay in a range of only a few millimeters. For generators, like direct drive or directly driven generators, this is very difficult due to their size. Direct drive generators show a diameter of several meters.

Rotor elements and stator elements are arranged opposite to each other, thus the air gap has to ensure that they do not come into contact while the generator is at operation.

Thus the air gap should be very small to ensure the efficiency of the generator on the one hand while a certain width of the air gap is needed to prevent mechanical damages.

Especially for a direct drive generator it is difficult to keep the air gap in a range of only a few millimeters. This requires therefore very rigid, massive and heavy support structures for the stator elements and for the rotor elements.

The air gap of a generator is determined:
by tolerances of the permanent magnets, which are part of the rotor,
by tolerances of the stacked laminate-plates, which are part of the stator, and/or
by tolerances of the coil-windings, which are part of the stator-coil.

Also other elements of the generator contribute to the dimensions of the air gap.

The air gap is designed in a way that the elements of the rotor and of the stator do not get in contact, while the rotor rotates around its dedicated rotational axis.

Different bearing arrangements for a direct drive generator are known. One of them is the so called "two bearing" arrangement. This arrangement is well known by the document EP 1 641 102 A1 or by the document U.S. Pat. No. 6,483, 199 B2 for example.

According to these documents the rotor of the generator is connected to the shaft of the wind turbine. The shaft itself is supported by two bearings. The stator of the generator is attached to one side via a bearing to a so called "stationary inner shaft". Thus the rotor rotates relatively to the stator around the stationary inner shaft.

Due to the one-sided support of the stator it is difficult to keep the air gap constant or at least nearly constant. Also gravity acts on the large generator, influencing the air gap. The rotor-components also influence the air gap due to the mass-inertia of the components. Magnetic forces, which act on the elements of the generator, and vibrations of the generator also influences the width of the air gap during the generator is at operation or at work.

The two bearing arrangement is replaced by the so called "single bearing arrangement". This technology is disclosed by the document US 2006/0152014 A1 and by the document WO 02/057624 A1 for example. A stationary inner bearing part is attached to a stationary inner shaft and a rotating outer bearing part supports the rotor of the direct drive generator.

FIG. 3 shows a typical and well known "one-bearing" arrangement. A wind turbine 401 comprises a direct drive generator 402, which is arranged on the upwind side of a tower 403 of the wind turbine 401.

A tower flange 404 is arranged on the top of the tower 403. A bedplate 405 is attached to the tower flange 404. The wind turbine 401 comprises a yaw system—not shown here—which is used to turn the bedplate 405 of the wind turbine 401 around the axis Y.

The wind turbine 401 comprises a stationary shaft 406, while the shaft 406 has a centre axis A. The rear side of the stationary shaft 406 is attached to a retaining arrangement 407. On the front side of the stationary shaft 406 a stator arrangement 408 of the direct drive generator 402 is arranged.

The stator arrangement 408 comprises a stator support structure 409 and a lamination stack 410. The lamination stack 410 supports windings 411.

The stator support structure 409 comprises two support elements 412 for a two side support of the lamination stack 410. The support elements 412 are ring-shaped. They are attached to the outside of the stationary shaft 406.

A hollow cylindrical support element 413 is attached to the outer ends of the ring-shaped support elements 412. The hollow cylindrical support element 413 carries the ring-shaped lamination stack 410 and the windings 411.

A rotor arrangement 414 is arranged around the stator arrangement 408. The rotor arrangement 414 comprises a front endplate 415 and a cylinder element 417. The front endplate 415 is ring-shaped, while the cylinder element 417 is hollow.

The cylinder element 417 comprises a plurality of permanent magnets 418, which are mounted on the inside of the hollow cylinder element 417.

The permanent magnets 418 are arranged opposite to the lamination stack 410 and the supported windings.

An air gap 419 with a width of approximately 5 mm is located between the permanent magnets 418 and the lamination stack 410.

The front endplate 415 is arranged on the stationary shaft 406 via a bearing 420. The bearing 420 is capable to transform axial loads in both directions of the centre axis A. An appropriate bearing is disclosed in DE 201 16 649 U1 for example.

The stationary part 421 of the bearing 420 is attached to the stationary shaft 406. The rotating part 422 of the bearing 420 is connected to a mounting ring 423. The front endplate 415 as well as the hub 424 are attached to the mounting ring 423. The hub 424 comprises mounting devices 425 for wind turbine rotor blades—not shown here.

The air gap 419 shown here is uniform to achieve a constant distance between the elements of the rotor and the elements of the stator. The one bearing design is very attractive due to its easy design. On the other side the single bearing arrangement shows the same drawbacks cited above.

Both cited bearing arrangements show its individual strengths and weaknesses.

If they are applied to a direct-drive-generator of a wind turbine there is a high probability that the air gap is not uniform any more. Due to the size of the generator components the cross section of the air gap will change in reference to the length of the air gap. Thus a non-uniform air gap might be the result. Thus the effectiveness of the generator will be decreased.

SUMMARY OF INVENTION

It is therefore the object of the invention to provide an arrangement to compensate the effect of a non-uniform air gap in an electric machine, especially in a huge generator like the direct-drive-generator.

This object is achieved by the features of the claims. Preferred configurations are object of the dependent claims.

According to the invention the electrical machine contains a stator arrangement and a rotor arrangement. The rotor-arrangement rotates or revolves around a longitudinal axis. This axis may be the longitudinal axis of the electrical machine.

At least parts of the rotor arrangement interact with parts of the stator arrangement to generate electrical power.

An air gap is defined by the distance between the parts of the rotor arrangement and the parts of the stator arrangement.

The parts of the stator arrangement are opposite to the parts of the rotor arrangement along a certain length.

The cross-section of the air gap changes along this length, so the air gap is not uniform in view to the referred length.

To compensate the negative effects of the non-uniform air gap the flux density of magnets, which are part of the rotor arrangement, is changed in dependency of the cross section of the air-gap.

Preferably permanent magnets are used at the rotor arrangement.

Preferably the magnetic flux density in the air gap is changed dependent to the cross section of the air-gap at a specific distance from the parts of the rotor arrangement.

In a first configuration of the invention the type of magnets could be changed along the non-uniform air gap. If the air gap shows a "small" first distance at a first side of the air gap, the dedicated magnets there may show a first magnetic flux density (or magnetic field strength).

If the air gap shows a "bigger" second distance at a second side of the air gap, the dedicated magnets there may show a second magnetic flux density (or magnetic field strength), which is increased in reference to the first magnetic flux density.

In a second configuration of the invention the size of the magnets could be changed along the non-uniform air gap. If the air gap shows a "small" first distance at a first side of the air gap, the size of the dedicated magnets there may show a first height in reference to the first distance. Thus the magnets will show a first magnetic flux density (or field strength).

If the air gap shows a "bigger" second distance at a second side of the air gap, the size of the dedicated magnets there may show a second height in reference to the second distance. Thus the magnets will show a second magnetic flux density (or field strength), which is increased in reference to the first magnetic flux density (magnetic field strength).

To balance the different heights of the magnets in relation to the air gap the magnets are arranged on different basements. The heights of the basements are chosen individually and dependent to the cross-section of the air gap.

Preferably the electrical machine contains a single-bearing arrangement. Thus only one bearing is used as unilaterally support of the rotor-arrangement. The bearing connects the rotor arrangement and the stator arrangement, while the rotor arrangement shows a supported first end and preferably an unsupported second end in reference to the longitudinal axis of the electrical machine.

Preferably the electrical machine is a generator.

Preferably the generator is a direct-drive-generator.

Preferably the generator is used in a wind-turbine.

Preferably the generator contains an outer-rotor and an inner stator, so the rotor revolves around the stator.

Preferably the generator has a stationary shaft with a centre axis. The stator arrangement is arranged on the outside of the stationary shaft. The rotor arrangement is substantially arranged around the stator arrangement. On the front side of the generator the rotor is at least indirectly supported or arranged on the stationary shaft by a main bearing.

The width of the air gap tends to vary during the operation of the electrical machine. The risk that the rotor arrangement hits the stator arrangement during the operation is reduced or even eliminated, as applied forces are taken into account by the non-uniform air gap.

On the other hand the effectiveness of the electrical machine is increased as the negative effects of the non-uniform air gap are reduced or even eliminated.

BRIEF DESCRIPTION OF THE DRAWINGS

The invention is described now in more detail by help of figures. The figures show different examples and do not limit the scope of the invention.

DETAILED DESCRIPTION OF INVENTION

Figure 1:
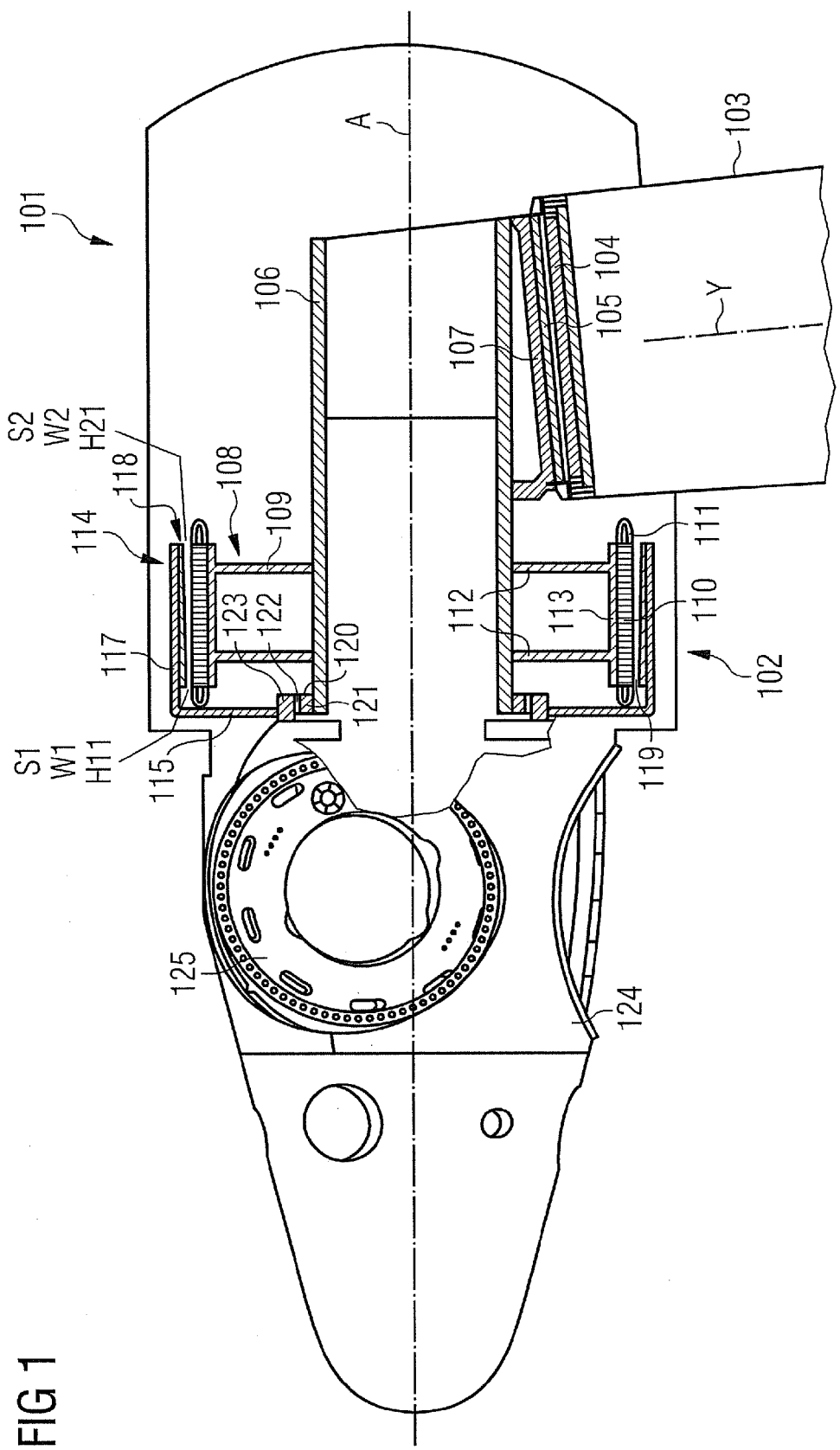
FIG. 1 shows a preferred configuration according to the invention.

A wind turbine 101 comprises a direct drive generator 102, which is arranged on the upwind side of a tower 103 of the wind turbine 101.

A tower flange 104 is arranged on the top of the tower 103. A bedplate 105 is attached to the tower flange 104. The wind turbine 101 comprises a yaw system—not shown here—which is used to turn the bedplate 105 of the wind turbine 101 around the axis Y.

The wind turbine 101 comprises a stationary shaft 106, while the shaft 106 has a centre axis A. The rear side of the stationary shaft 106 is attached to a retaining arrangement 107. On the front side of the stationary shaft 106 a stator arrangement 108 of the direct drive generator 102 is arranged.

The stator arrangement 108 comprises a stator support structure 109 and a lamination stack 110. The lamination stack 110 supports at least one winding 111.

The stator support structure 109 comprises two support elements 112 for a two side support of the lamination stack 110. The support elements 112 are ring-shaped. They are attached to the outside of the stationary shaft 106.

The ring-shaped support elements 112 show the same diameter and thus the same height of construction.

A hollow cylindrical support element 113 is attached to the outer ends of the ring-shaped support elements 112. The hollow cylindrical support element 113 carries the ring-shaped lamination stack 110 and the windings 111.

A rotor arrangement 114 is arranged around the stator arrangement 108. The rotor arrangement 114 comprises a front endplate 115 and a cylinder element 117. The front endplate 115 is ring-shaped, while the cylinder element 117 is hollow.

The cylinder element 117 comprises a plurality of permanent magnets 118, which are mounted on the inside of the hollow cylinder element 117.

The permanent magnets 118 are arranged opposite to the lamination stack 110 and the supported windings.

An non-uniform air gap 119 with an averaged width of approximately 5 mm is located between the permanent magnets 318 and the lamination stack 110.

The front endplate 115 is arranged on the stationary shaft 106 via a bearing 120. The bearing 120 is capable to transform axial loads in both directions of the centre axis A. An appropriate bearing is disclosed in DE 201 16 649 U1 for example.

The stationary part 121 of the bearing 120 is attached to the stationary shaft 106. The rotating part 122 of the bearing 120 is connected to a mounting ring 123. The front endplate 115 as well as the hub 124 are attached to the mounting ring 123. The hub 124 comprises mounting devices 125 for wind turbine rotor blades—not shown here.

According to the invention the permanent magnets 118 show different sizes and thus different heights H11, H21 in reference to the cross section of the non uniform air gap 119.

A first side S1 of the air gap 119 is adjacent to the front endplate 115. The air gap 119 shows at this side S1 a first width W1.

The first width W1 has to assure, that a contact between respective components of the stator arrangement 108 and of the rotor arrangement 114 is prevented if the generator 102 is in operation.

A second side S2 of the air gap 119 is opposite to the first side S1. The air gap 119 shows at this side S2 a second width W2.

Due to the position of the bearing-elements 120, 122, 123 the second width W2 is bigger than the first width W1.

The second width W2 has to assure that a contact between respective components of the stator arrangement 108 and of the rotor arrangement 114 is prevented if the generator 102 is in operation.

The non-uniform air gap allows compensation and absorption of:
gravity-forces, which act on the components of the rotor,
aerodynamic loads, which are induced from the hub 124 via the shaft 106 to the generator 102,
mass-inertia created by the rotating elements of the generator 102,
magnetic forces, which act on the elements of the generator, or of
vibrations.

It has to be noted that the two support elements 112 for the two side support of the lamination stack 110 show preferably equal lengths.

Figure 2:
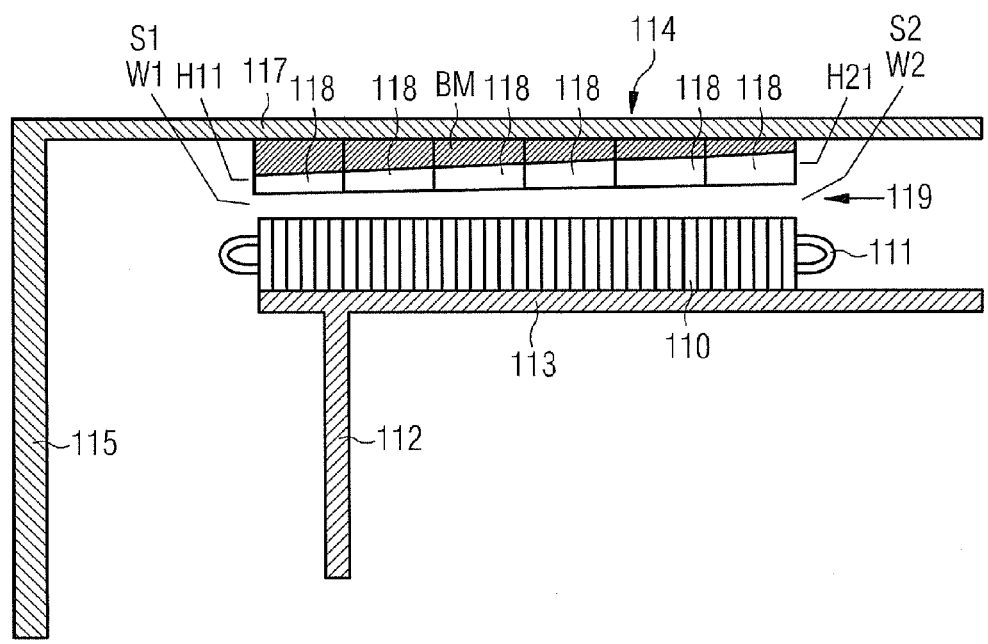
FIG. 2 shows details of FIG. 1.
Figure 3:
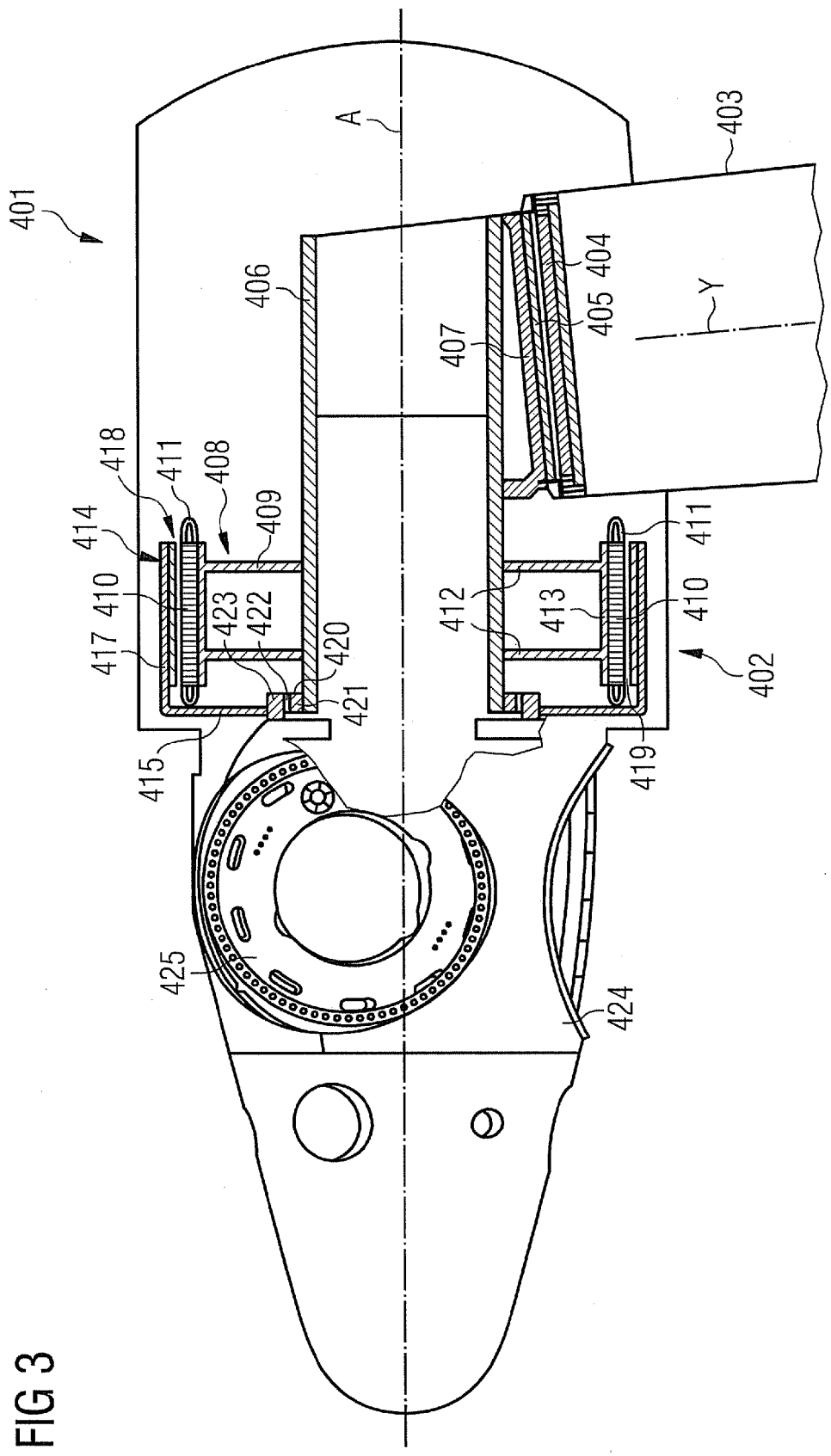
FIG. 3 shows a well established "one-bearing arrangement" of a direct-drive-generator as described in the introduction of this application.

FIG. 2 shows details of FIG. 1.

The size of the magnets 118 is changed along the non-uniform air gap 119. If the air gap 119 shows a "small" first distance or width W1 at the first side S1 of the air gap 119, the dedicated magnets show a first height H11 in reference to the first width W1. Thus the magnets 118 show a first magnetic field strength (flux density) at this side S1.

If the air gap 119 shows a "bigger" second distance or width W2 at the second side S2 of the air gap 119, the dedicated magnets show a second height H21 in reference to the second width W2. Thus the magnets 118 show a second magnetic field strength (flux density) at this side S2, while the field strength (flux density) at this side S2 is increased in reference to the first magnetic field strength (flux density) at the side S1.

To balance the different heights 1411 and 1421 of the magnets 118 in relation to the changing cross-section of the air gap 119 the magnets 118 are arranged on different basements BM.

The heights of the basements BM are chosen individually and in dependency to the cross-section of the air gap 119.

It has to be noted, that the invention is especially suitable for generators, which contains a segmented stator and/or a segmented rotor. This generator contains a number of segments, which are connected to the stator/rotor at a production-facility or a site for example.

This structure is especially suitable for direct drive generators for wind turbines, as they show a typical diameter of 4 meter or more.

As the non-uniform air gap is compensated by adjustments aside the rotor, the adjustments can be made easily before the segments are brought together to form the whole generator.

It is also possible to choose the heights of the basements BM to increase or even to generate a non-uniform air gap.

The cross-section of the air gap and the height/thickness of the magnets may be changed in a stepwise manner to achieve an effective compensation.

In a preferred embodiment of the invention the air gap shows a distance-value of 6 mm at the first side S1 and a height or thickness of the first magnet of 20 mm at the side S1.

The air gap at the second side is preferably 9 mm whereby the corresponding height or thickness of the magnet there is 30 mm. Thus the air gap is increased by a factor of 1.5 from the first side S1 to the second side S2, while the effect of the non-uniform air gap is compensated by a similar increase of the height/thickness of the magnets by a factor of 1.5.

In another preferred embodiment of the invention the compensation of the non-uniform air gap is achieved by a combination of an increase in the magnet strength. The magnet strength may be varied between 1.1 Tesla to 1.2 Tesla and/or by different height/thickness of the magnets.

The invention claimed is:

1. An arrangement to compensate for a non-uniform air gap in an electric machine, comprising:
a stator arrangement;
a rotor arrangement;
an air gap; and
a plurality of magnets,
wherein the rotor arrangement rotates around a longitudinal axis,
wherein at least a plurality of first parts of the rotor arrangement interact with a plurality of second parts of the stator arrangement to generate electrical power,
wherein the air gap is defined by a distance between the plurality of first parts of the rotor arrangement and the plurality of second parts of the stator arrangement,
wherein the plurality of second parts of the stator arrangement are opposite to the plurality of first parts of the rotor arrangement along a certain length,
wherein a cross section of the air gap changes along the certain length, so the air gap is not uniform in view to the referred certain length,
wherein the rotor arrangement comprises the plurality of magnets, and
wherein a magnetic flux density in the air gap is changed dependent on the cross section of the air-gap,
wherein a size or a height of the plurality of magnets is changed along the non-uniform air gap, wherein the air gap includes on a first side a first width and the air gap includes on a second side a second width, wherein the plurality of magnets include a first height in reference to the first width at the first side, and wherein the plurality of magnets include a second height in reference to the second width at the second side, while the first height is lower than the second height, wherein the plurality of magnets are permanent magnets, wherein the plurality of magnets are arranged on a plurality of basements to balance the different heights of the plurality of magnets in relation to the air gap, and wherein a first plurality of basements of the magnets, which are close to the first side of the air gap, are lower than a second plurality of basements of the magnets, which are close to the second side of the air gap.

2. The arrangement according to claim 1, wherein the magnetic flux density is changed by a first variation of a magnet-size in relation to the air gap, and by a second variation of a magnet-height in relation to the air gap, and by a third variation of a strength or a magnetic field-strength of the plurality of magnets in relation to the air gap.

3. The arrangement according to claim 1, wherein the magnetic flux density is changed by a first variation of a magnet-size in relation to the air gap.

4. The arrangement according to claim 1, wherein the magnetic flux density is changed by a second variation of a magnet-height in relation to the air gap.

5. The arrangement according to claim 1, wherein the magnetic flux density is changed by a third variation of a strength or a magnetic field-strength of the plurality of magnets in relation to the air gap.

6. The arrangement according to claim 1, wherein a type of the plurality of magnets is changed along the non-uniform air gap to adjust the magnetic field-strength or magnetic flux density of the plurality of magnets in dependency to the cross section of the air-gap.

7. The arrangement according to claim 1, wherein an electrical coil is used as a magnet aside the rotor arrangement.

8. The arrangement according to claim 1,
wherein the stator arrangement comprises a lamination stack, which is constructed to support a winding of a stator-coil, and
wherein the rotor arrangement comprises a plurality of permanent magnets.

9. The arrangement according to claim 1, where the stator arrangement and the rotor arrangement are connected via a single main bearing.

10. The arrangement according to claim 1,
wherein the stator arrangement comprises a stator support structure and a lamination stack,
wherein the lamination stack is constructed to support a winding of the stator-coil,
wherein the stator support structure comprises two support elements for a two-sided support of the lamination stack,
wherein the support elements are ring-shaped,
wherein the support elements are connected via a single main bearing to the rotor arrangement,
wherein a plurality of outer ends of the ring-shaped support elements are attached to a hollow cylindrical support element, and
wherein the hollow cylindrical support element carries the ring-shaped lamination stack and the winding.

11. The arrangement according to claim 10, wherein the ring-shaped support elements include a same diameter.

12. The arrangement according to claim 1,
wherein the rotor arrangement comprises a front endplate and a cylinder element,
where the front endplate is ring-shaped, while the cylinder element is hollow,
where the cylinder element carries the plurality of permanent magnets, which are mounted on an inside of the hollow cylinder element,
wherein the plurality of permanent magnets are arranged opposite to a lamination stack and a supported winding, and
wherein the air gap is located between the plurality of permanent magnets and supported windings of a stator-coil.

13. The arrangement according to claim 12,
wherein a first side of the air gap is adjacent to the front endplate,
wherein the plurality of permanent magnets, which are located at the first side, include a predefined first height in reference to the longitudinal axis,
wherein the plurality of permanent magnets, which are located at a second side, include a predefined second height in reference to the longitudinal axis, and
wherein the second height is lower than the first height.

14. The arrangement according to claim 1, wherein the electrical machine is a generator.

15. The arrangement according to claim 14,
wherein the generator comprises an outer-rotor and an inner stator, so a rotor revolves around a stator, and/or
wherein the generator is a direct-drive-generator, which is located in a wind-turbine.

16. The arrangement according to claim 14,
wherein the generator includes a stationary shaft with a centre axis,
wherein the stator arrangement is arranged on the outside of the stationary shaft,
wherein the rotor arrangement is substantially arranged around the stator arrangement,
wherein the rotor arrangement is supported on the stationary shaft by a single main bearing, and
wherein the main bearing is located on the front side of the generator.

* * * * *